Oct. 8, 1940.  F. B. ADAM  2,216,870
BUS DUCT
Filed Sept. 18, 1937  3 Sheets-Sheet 1

INVENTOR.
Frederick B. Adam
BY
Roy M. Eilers
ATTORNEY

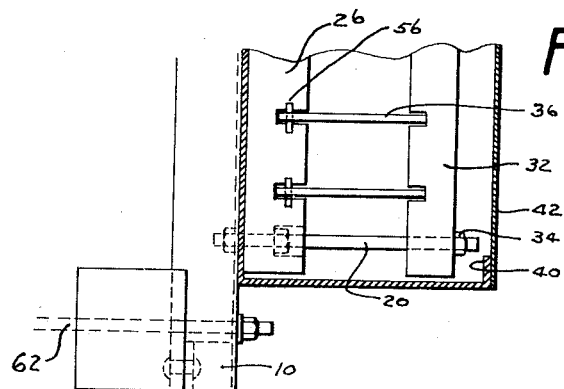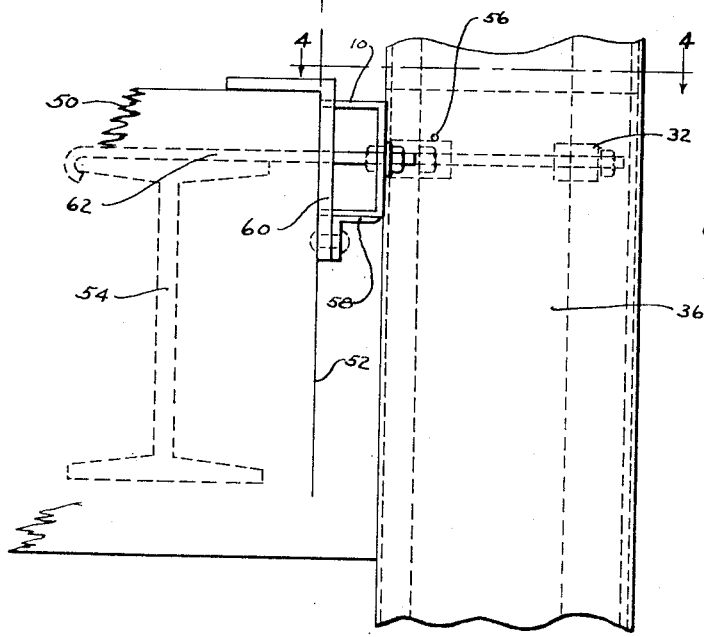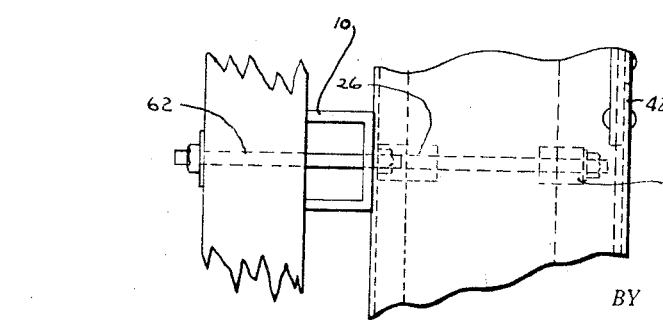

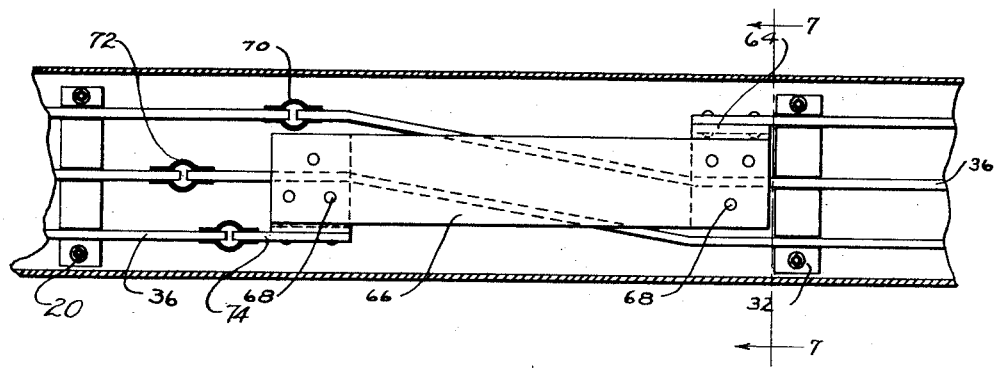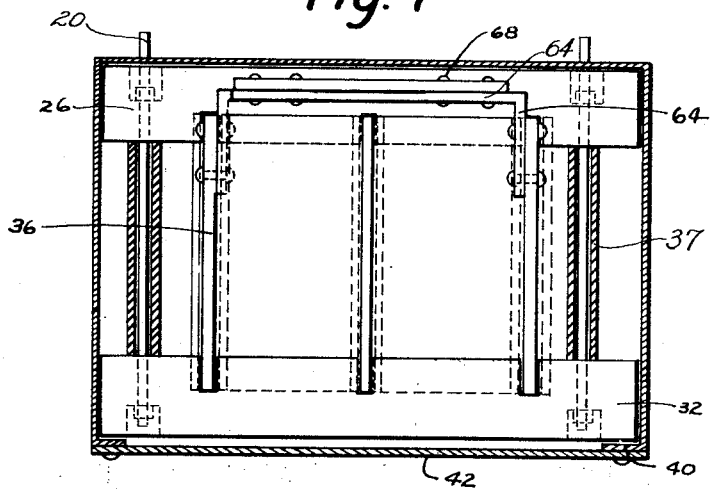

Patented Oct. 8, 1940

2,216,870

UNITED STATES PATENT OFFICE 2,216,870

BUS DUCT

Frederick B. Adam, St. Louis County, Mo., assignor to Frank Adam Electric Company, St. Louis, Mo., a corporation of Missouri Application September 18, 1937, Serial No. 164,467

3 Claims. (Cl. 174—99)

This invention relates to ducts particularly of the type for enclosing and carrying electrical conductors.

Many of the present types of ducts for enclosing and carrying bus bars utilize the enclosure itself as a supporting means for the bus bars or conductors. This type of construction necessitates the use of extra heavy material for the enclosure which greatly increases costs, materially adds to the load on the ceiling or roof of the building where the duct is installed, and makes the installation of the duct more difficult. It is an object of the present invention to provide a duct which will avoid the above difficulties and yet be less expensive and more easily installed than ducts of the present type.

This result is accomplished in my invention by supporting the current carrying bus bars with insulators positioned on supports at certain specified points, which supports also hold the metal enclosure in proper position for space clearance around the bus bar.

The invention provides for the standardization of the joints of the enclosure for easy installation, and for expansion and contraction of the bus bars and conductors.

The invention also provides for the transposition of the conductors of a multi-phase alternating current system to reduce the minimum inductive effect of parallel conductors.

Provision is also made for supporting a vertical run of bus duct so that there may be a permanent support at each floor for all of the bus bars and enclosure, as well as each individual bus bar.

The invention also provides an insulator clamp for the bus bars in the duct which supports the bars loosely until all are properly positioned, and which may then be tightened to clamp all of the bus bars in their permanent positions.

Further objects and advantages as well as the means of accomplishing the same will appear from the following detailed description and accompanying drawings in which:

Fig. 3 is a longitudinal cross-sectional view of a vertical run of bus duct at the floor level.

Fig. 4 is a view at line 4—4 of Fig. 3.

Fig. 5 is a longitudinal cross-sectional view of a vertical run of bus duct between floor levels.

Fig. 6 is a longitudinal cross section of a section of the duct at a transposition point.

Fig. 7 is a view taken on line 7—7 of Fig. 6.

Figure 1:
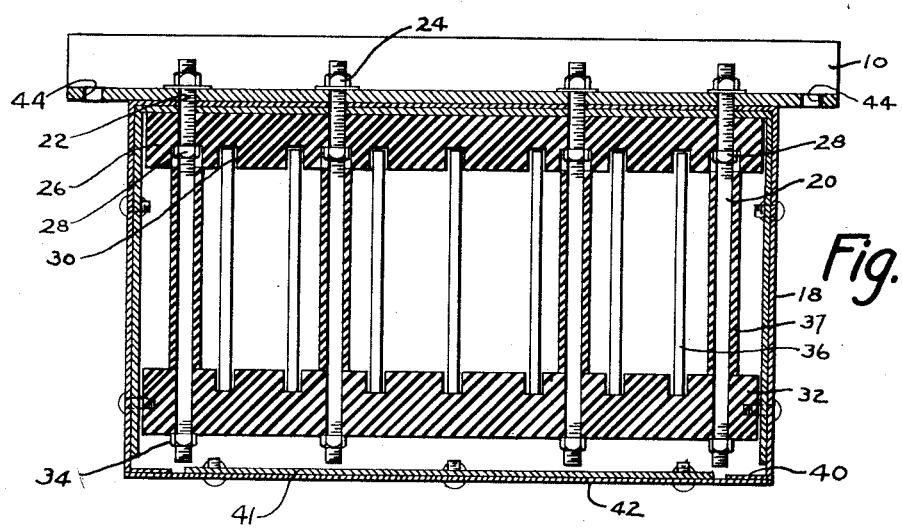
Fig. 1 is a cross section of the bus duct with bus bars clamped in position.
Figure 2:
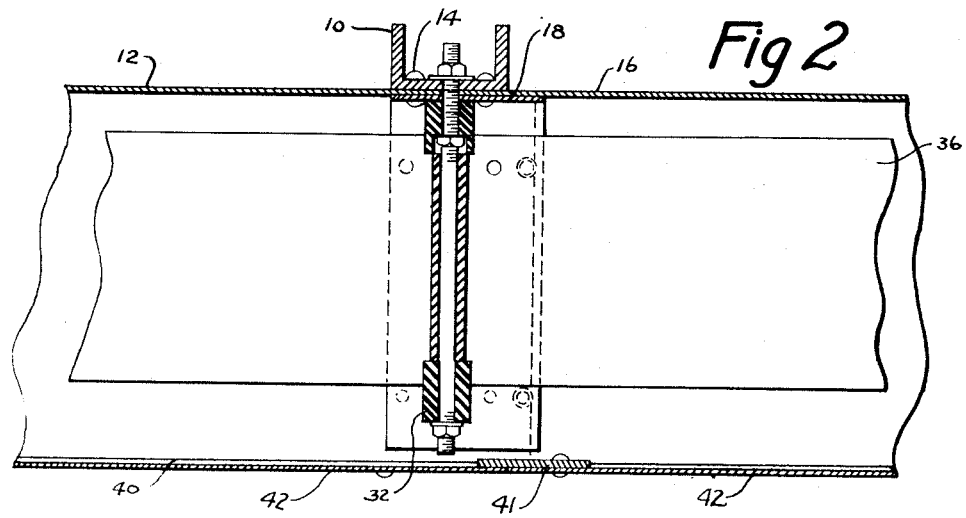
Fig. 2 is a longitudinal cross-sectional view of the bus duct.

Referring now to the drawings in which the same numerals are used to denote the same or similar parts: 10 is a channel member which is secured to one end of each duct section. 12 indicates one such section to which the channel member may be secured as by rivets 14. 16 is an adjoining section of duct which is not secured to the same channel member but slips over a reinforcing band 18 which is secured to the duct section 12. The top of this reinforcing band is also secured to the channel member 10 as shown. 20 indicates bolts which may extend through openings 22 in the channel member to be supported therefrom by nuts 24. 26 is an upper insulating cleat or clamp, which is held against the top of the bus duct section by nuts 28, and is provided with suitable slots 30 to accommodate the bus bar for which the particular duct is designed. 32 is a lower insulating clamp held in place by nuts 34 which serve to support bus bars 36 or any other conductor for which the particular duct may be designed. The nuts 28 directly support the main insulating cleat against the reinforcing band 18 through the main enclosure 12 and through the channel support 10, clamping all of these parts rigidly together so that when the movable cleat 32 is supported on the lower end of the bolts 20, the bus bars are directly supported by the main supporting channel 10.

37 indicates sleeves which may be constructed of insulating material if desired and which serve to space the upper insulating clamp 26 from the lower insulating clamp 32 so as to provide the desired amount of clamping on the bus bars. Thus it is possible to clamp the bus bars in the slots just tight enough to allow some movement for expansion and contraction.

The bus duct sections 12 and 16 may be formed substantially as shown, that is, of a U shape with flanges 40 to which a cover 42 may be secured. Then flanges 40 will support the lower clamp member if nuts 34 on bolts 20 are removed. This is especially advantageous in installing the bus bars in the duct. The particular shape or formation of the sections may, of course, be varied to conform with any particular requirement. A reinforcing strip 41 is secured to one end of each cover 42.

Various methods may be used in installing this bus duct. The duct sections without the bus bars may be put in position by securing the channel members to the ceiling or joists of a room with bolts or screws through the openings 44. Due to the particular way in which the sections and reinforcing band are formed, one section of duct may be put in place and then the adjoining duct end not provided with the channel member may be slipped over the reinforcing band of the section already in place. The other end of this duct section which is provided with a channel member is then secured to the ceiling by its channel member and another adjoining section slipped on in like manner. The nuts 34 are either loosened or removed and the lower insulating cleat allowed to rest on the flanges 40. The bus bars may then be slid into place in between the upper and lower insulating clamps, after which they may be properly positioned in the respective slots. After all the bus bars are positioned, the lower insulating clamp may be tightened the desired amount. The enclosure may then be closed by securing the cover 42 in place.

If would, of course, be possible to install small sizes of the bus duct with the conductor bars already in place. For the large sizes, however, it is more practical to follow the above procedure.

It will be noted that all the weight of the bus bars and insulating clamps is carried by the channel members and not by any part of the duct enclosure. This makes it possible to use thinner material for the duct enclosure than if the duct enclosure had to support the bus bars or any part of them.

Figs. 3, 4, and 5 show vertical sections of the bus duct which are used when bus bars must be run vertically as from one floor of a building to another. In these drawings the numeral 50 indicates the floor of a building, 52 the building wall, and 54 a beam of the building. One of the insulating clamp members 26 of the bus duct may be provided with pins 56 which project through the bus bars onto the insulator clamps and serve to give the bus bar vertical support.

The duct assembly is supported vertically by an angle 58 upon which the channel member of the duct section rests. The channel member is held against the wall by the long bolt 62 which may be bent around a beam or other object as shown in Fig. 3. Figs. 6 and 7 show how I may provide for transposition of the bus bars. 64 is an angle and 66 a bus bar. Rivets 68 secure the pieces together. 70 indicates expansion joints formed from a plurality of thin conductors 72. This joint allows movement of the bus bars under expansion and contraction. By placing the expansion and transposition joints together as shown, it is possible to use a small section of bus bar 74 for connection with both expansion and transposition joints.

While I have illustrated and described only one form of my invention, it is to be understood that various additions, modifications, substitutions, and omissions may be made therein without departing from the spirit and scope of the invention as defined by the appended claims.

I claim:

1. A bus duct comprising a U-shaped enclosure section, a supporting channel member to be secured to the ceiling or roof of a building, a plurality of rods hanging from said member and passing through openings in said section, an upper slotted insulation cleat adjacent to and within said section, means on said rods to clamp said section between said cleat and said member, a lower slotted insulation cleat secured to and supported by the lower ends of said rods by means independent of said first named means, spacing members positioned between the upper and lower insulating cleats, the distance between said cleats being determined by the spacing members, bus bars positioned in the slots of the upper and lower cleats and slidably supported by the lower cleat, the rods and the channel member, the enclosure section being free from the weight of the bus bars, insulators, or rods.

2. A bus duct unit comprising in combination, a channel member to be secured to the ceiling or roof of a building, a U-shaped enclosure section mounted below said channel member, a plurality of bus supporting rods depending from said member and extending through the center wall of said section, a slotted insulation cleat within and abutting the center wall of said section, means on said rods engaging said cleat for clamping the section between the cleat and member, a second slotted insulation cleat spaced from said first cleat and supported on the lower ends of said rods by means independent of said first named means.

3. A bus duct unit comprising in combination, a supporting channel member to be secured to the ceiling or roof of a building, a U-shaped enclosure section having inturned flanges on its free edges, located below said member, a plurality of bus supporting rods depending from said member and passing through openings in said section, a slotted insulation cleat within said section and abutting the center wall of said section, means on said rods engaging said cleat to clamp said section against said member, a second slotted insulation cleat detachably attached to the lower ends of said rods by means independent of said first named means, said second cleat having a length greater than the distance between the inturned flanges of said section so that when said second cleat is detached from the rods, for removal or insertion of bus bars, said second cleat may be supported on said flanges.

FREDERICK B. ADAM.